March 3, 1953
R. F. TURNBULL
2,630,151
PORTABLE TRACK-GUIDED TILT ROUTER
Filed May 22, 1950
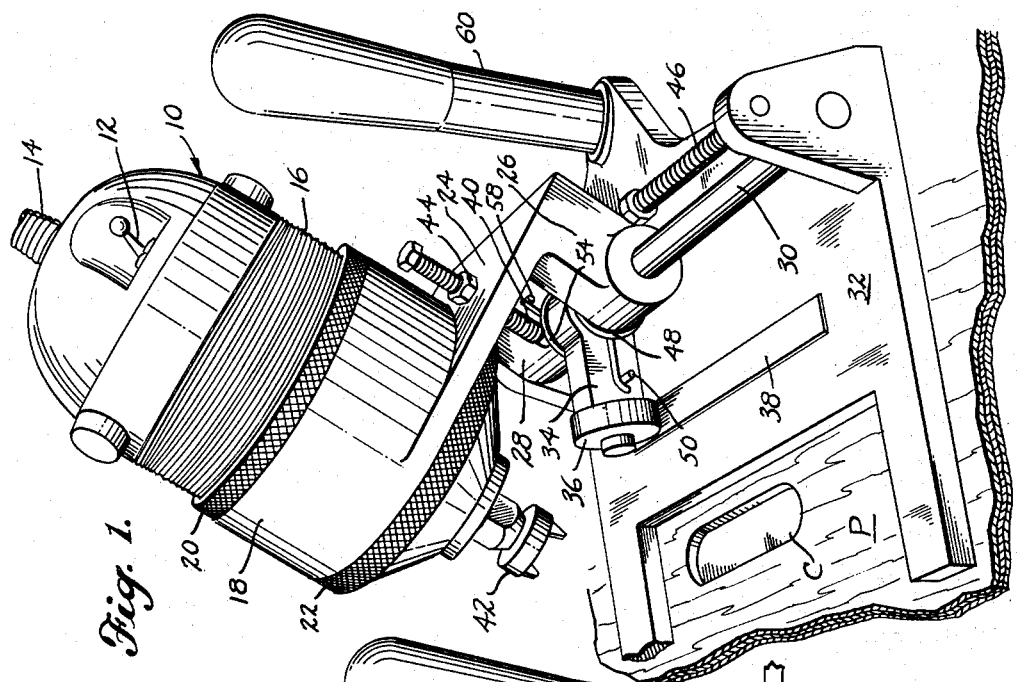
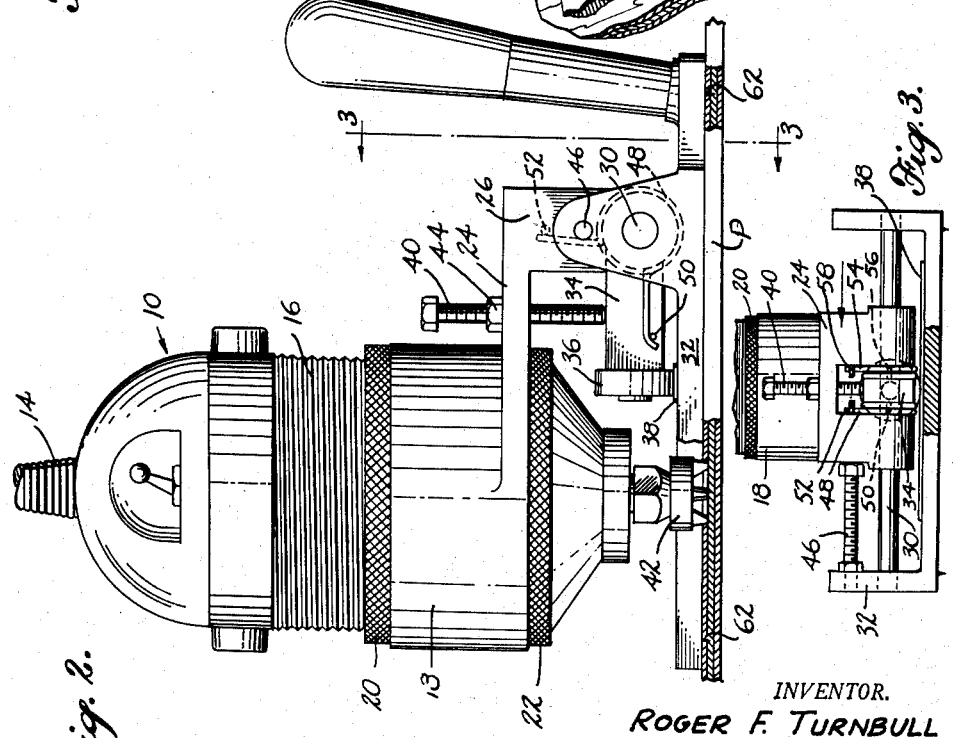
INVENTOR.
ROGER F. TURNBULL
BY
Reynolds, Beach & Christensen
ATTORNEYS Patented Mar. 3, 1953

2,630,151

UNITED STATES PATENT OFFICE 2,630,151

PORTABLE TRACK-GUIDED TILT ROUTER

Roger F. Turnbull, Tacoma, Wash., assignor to American Manufacturing Company, Inc., Tacoma, Wash., a corporation of Washington Application May 22, 1950, Serial No. 163,501

5 Claims. (Cl. 144—136)

The present invention relates to a portable router for use in plywood patching operations or similar applications requiring cutting into the face of a plywood panel, for example, to remove a defect area and form a standard cavity or recess of precise dimensions and shape to receive a precision-cut standard patch.

One of the operations necessary to the manufacture of commercial grade plywood is the removal of bark seams, pitch pockets and other flaws occurring in the face ply. The cut-away blemish areas are then replaced with accurately fitted patches of clear veneer as inconspicuously as possible. A hand tool in the nature of a gouge or chisel having an arcuately shaped cutting edge was used most frequently heretofore in cutting the standard patch cavity. The outline of such a cavity was cut by two impressions of the tool to surround the blemish area with a continuous boat-shaped cut line. Thereupon the enclosed face ply material was gouged out with the same or another hand tool to form a clean recess of a depth equal to the thickness of the face ply. A standard patch of like shape and dimensions was then pounded into the recess and held there by a suitable adhesive.

While workmen became extremely skilled at patching plywood in this manner, nevertheless the exacting step of cutting the patch cavities as described was time consuming and expensive. Moreover, even the best workmen would make occasional mistakes which had to be covered up by additional patching.

While suggestions have been made for power routers to be used in this operation, none previously have been entirely satisfactory.

An object of my present invention is to provide a portable router tool for cutting these patch cavities with greater precision and rapidity than heretofore.

A related object is to devise a manually operated power router of that type having a supporting base which will rest directly on a plywood panel wherever a defect area is to be removed for patching, such base constituting a stable reference from which movement of the router cutter may be guided and its limits of movement accurately gauged for correct length and depth of cut.

Another and highly important object is to provide such a power router, wherein the router head and its support will not obstruct a clear view of the blemish area when the router is being positioned for cutting in the correct area.

With these and other objects in mind, the novel router includes means carried by the supporting base for guiding the router head in translation along a straight path parallel to the face plane of the plywood panel, and cooperating means guiding such router head for tilting to and from the panel independent of its translational position. A carriage or moving reference member moves in translation conjointly with the router head while being maintained in constant angular relation to and spacing from the plywood panel. This carriage member serves as a traveling stop or abutment member engageable by a cooperating abutment member carried for tilting with the router head. Engagement of these members accurately limits downward tilting of the router head for gauging depth of cut of the router in the plywood panel and for insuring that the router rotation axis will be substantially vertical in all cutting positions.

Further, such carriage member serves as a traveling support for spring means reactive therefrom to urge the tilting router head normally upward into retracted position relative to the plywood panel, so that except when the router head is deliberately lowered and applied to the panel for cutting purposes the tool remains out of contact with the panel and a clear view is afforded of the blemish area to be cut. This feature of a tilting router head urged normally upward by the spring therefore greatly reduces the possibility of accidental cuts and nicks in the face of the panel when initially placing the router on a panel, and enables the router to be located accurately and conveniently in the correct cutting area by affording a clear view of such area to the operator.

These and other features, objects and advantages of the invention will now become evident from the following detailed description of a preferred form of the portable router as shown in the accompanying drawings. It will be understood, however, that various modifications and equivalent features of construction may be employed without departing from the essential principles of the invention set forth herein and more particularly defined in the accompanying claims.

Figure 1 is a perspective view of the router tool resting on a plywood panel, the latter being shown fragmentarily and the router head being shown in its terminal released position after cutting of a standard patch cavity in the panel.

Figure 2 is a side elevation of the router engaged in a cutting operation.

Figure 3 is a vertical sectional view taken on line 3—3 in Figure 2 of the router, with parts broken away for convenience in illustration.

The router head includes a high-speed electric router motor 10 provided with an on-off control switch 12 and supplied with electric power through a flexible electric cord 14 in conventional manner. This conventional router motor has a cylindrical casing 16, the lower major exterior portion of which is formed with screw threads and passes slidably through a supporting collar 18. Threaded annular lock nuts 20 and 22 at top and bottom edges of the collar 18 engage the threaded body portion of the motor to lock the same in any selected axially adjusted position relative to collar 18. In Figure 2 it will be seen that the motor occupies its highest position relative to the collar in the illustrative case.

The collar 18 in turn has a laterally projecting support bracket 24 provided with two downwardly projecting lugs 26 and 28 which are aligned and apertured to slide on the horizontal guide rod 30 and tilt about the axis of this rod. This guide rod, which is supported at its ends by upwardly projecting portions of the stabilizing base 32, serves as a track guiding the router head for translational movement parallel to a plywood panel P upon which the base is resting. Moreover, the guide rod 30 serves as a fulcrum for tilting of the router head to and from the plywood panel in any of the positions of such head along its path of bodily translation.

In the space between the slide-journal lugs 26 and 28 is received the apertured end of a carriage member 34 likewise slidable on track 30 for translational movement with the router head. The opposite end of this carriage member is suitably guided for movement along a parallel path in order to maintain a constant angular relationship and spacing between the plywood panel and the body of carriage member 34. As shown, such additional guidance for the carriage member is provided by rolling engagement of a roller 36, carried by the carriage member, with an upset track 38 extending along the top face of the supporting base 32. This track is accurately machined as a plane surface which is parallel to the supporting plane of the base 32 resting on the face of a plywood panel. When the router head is tilted downward, an adjustable screw 40, as a tilt gauge abutment carried by the router head bracket 24, engages the carriage member 34 as a cooperating base or reference abutment. Such engagement occurs when the router axis reaches perpendicular relationship to the panel, which is the correct tool angle. Such engagement also establishes or limits the depth of cut of router cutting tool 42. Since track 38 is planar and parallel to the panel, the relationships just mentioned are maintained as the router head and carriage member 34 move conjointly in translation along tracks 30 and 38. Casing 16 is adjusted lengthwise in collar 18 and is held by lock nuts 20 and 22 such that in the lowered or stop position of the router head the cutter 42 will remove the defect material in the plywood panel to a depth corresponding to the thickness of the first or face ply of the panel, as indicated by the illustration of the completed router cut C shown in Figure 1.

The standard patch recess cut, which in this case is oblong with semicircular rounded ends, is formed with the router guide rod 30 oriented approximately parallel to the grain of the wood in the face ply, and the router tool rotation axis vertical. Consequently, when a standard patch of equal shape and size, and of length-running grain, is bonded in place with suitable adhesive, the completed panel is not materially weakened by the patch nor is its appearance noticeably marred. Preferably the router cutting tool 42 is of a type which provides a slight draft or inward taper between opposing sides of the patch cavity C cut thereby. The corresponding standard patch will be formed with complementally beveled edges.

The length of the patch cavity C cut by the router tool is accurately established to conform to the standard length patch by providing an adjustable screw stop 46 carried by an upwardly projecting portion of the supporting base 32 to engage one of the slide journal lugs 26 on bracket 24 and thereby limit positively translational movement of the router head in one direction along the track 30. Movement of the router head in the opposite direction is limited by direct engagement of the other lug 28 with a fixed upwardly projecting base portion which supports the corresponding end of the track rod 30.

An important and desirable feature of the novel router for plywood patching operations resides in the router head tilting feature and further in the provision of a coil spring 48, or equivalent, urging the head normally into retracted position. This spring encircles slide rod 30 in the space between one side of the carriage member 34 and the bracket lug 26, one end of such spring reacting from a pin 50 on the carriage member and the other end of the spring engaging a pin 52 (Figure 3) on the inner face of lug 26 to apply a clockwise movement to lug 26 as viewed in Figure 2. A similar spring 54 encircles slide rod 30 on the opposite side of carriage member 34 and reacts between pins 56 and 58 carried by lug 28 and carriage member 34, respectively, in aid of the first spring. The combined force of these springs maintains the router head normally in upraised position relative to the plywood panel. In order to apply the router cutting tool 42 to the panel, it is necessary for the operator to forcibly tilt the router head downward into engagement with the work. The springs 48 and 54 are readily yieldable to permit that result, but by normally maintaining the router head tilted up and back the view of the work is greatly improved for accurately locating the router, and the possibility of accidental cutting or nicking of the panel when the router unit is being positioned on the panel or shifted between positions for cutting in selected areas is reduced. After the router is properly positioned on the panel, switch 12 may be turned "on" and the routing operation started.

For convenience in handling the router and holding its base steady while moving the router head for cutting, such base has an upwardly projecting handle 60. This handle is held in one hand to steady the router as the router head is manipulated with the other hand to perform the cutting operation, which operation includes lowering the router head into cutting position and moving it along track 30 between its end positions of travel while fully lowered. Two or more small anchor points 62 project down from the bottom face of base 32 to prick the panel surface and assist in holding the base against inadvertent sliding thereon. Such points are so small, however, that the marks which they leave are unnoticeable.

I claim as my invention:

1. A portable router for plywood patching operations or the like, said router comprising a supporting base adapted to rest stably on a generally horizontal plywood panel when positioned thereon for routing a defect area from the face ply of such panel by progressive movement thereover, a router head for carrying and driving a router tool, track means fixed on said base and extending in a line parallel to the plane of the plywood panel upon which the base is resting, router head carriage means slidable along said track means and carrying said router head pivotally in relation to said base to permit swinging of such router head to and from cutting engagement with the plywood panel about an axis substantially parallel to such panel, stop means comprising an elongated guide element fixed on said base and extending parallel to said track means, and traveling abutment means engageable with said guide element and interposed between such element and the router head to limit downward tilting of said router head relative to the panel positively in all positions of said router head along said track and thereby limit the depth of cut in the panel, and stop means limiting movement of said carriage in both directions along said track positively to fix the length of cut of the router, wherein the traveling abutment means comprises a first abutment member fixed to the router head for tilting therewith, and a second abutment member continuously contacting the guide element and engageable by said first abutment member to limit downward tilting of the router head in cutting position thereof, said second abutment member being connected to the router head carriage to travel therewith along the track means.

2. A portable router for plywood patching operations or the like, said router comprising a supporting base adapted to rest stably on a generally horizontal plywood panel when positioned thereon for routing a defect area from the face ply of such panel by progressive movement thereover, a router head for carrying and driving a router tool, track means fixed on said base and extending in a line parallel to the plane of the plywood panel upon which the base is resting, router head carriage means slidable along said track means and carrying said router head pivotally in relation to said base to permit swinging of such router head to and from cutting engagement with the plywood panel about an axis substantially parallel to such panel, stop means comprising an elongated guide element fixed on said base and extending parallel to said track means, and traveling abutment means engageable with said guide element and interposed between such element and the router head to limit downward tilting of said router head relative to the panel positively in all positions of said router head along said track and thereby limit the depth of cut in the panel, and stop means limiting movement of said carriage in both directions along said track positively to fix the length of cut of the router, wherein the traveling abutment means comprises a first abutment member fixed to the router head for tilting therewith, and a second abutment member continuously contacting the guide element and engageable by said first abutment member to limit downward tilting of the router head in cutting position thereof, said second abutment member being connected to the router head carriage to travel therewith along the track means, wherein the guide element comprises a flat track on the supporting base and the second abutment element includes a roller engaging said track to roll thereon during travel of the router head carriage.

3. A portable router for plywood patching operations or the like, said router comprising a supporting base adapted to rest stably on a generally horizontal plywood panel when positioned thereon for routing a defect area from the face ply of such panel by progressive movement thereover, a router head for carrying and driving a router tool, track means fixed on said base and extending in a line parallel to the plane of the plywood panel upon which the base is resting, router head carriage means slidable along said track means and carrying said router head pivotally in relation to said base to permit swinging of such router head to and from cutting engagement with the plywood panel about an axis substantially parallel to such panel, stop means comprising an elongated guide element fixed on said base and extending parallel to said track means, and traveling abutment means engageable with said guide element and interposed between such element and the router head to limit downward tilting of said router head relative to the panel positively in all positions of said router head along said track and thereby limit the depth of cut in the panel, and stop means limiting movement of said carriage in both directions along said track positively to fix the length of cut of the router, wherein the traveling abutment means comprises a first abutment member fixed to the router head for tilting therewith, and a second abutment member continuously contacting the guide element and engageable by said first abutment member to limit downward tilting of the router head in cutting position thereof, said second abutment member being connected to the router head carriage to travel therewith along the track means, wherein the guide element comprises a flat track on the supporting base and the second abutment element includes a roller engaging said track to roll thereon during travel of the router head carriage, and spring means interposed between the second abutment member and the router head to urge the latter into upwardly tilted position away from the panel by reaction of said spring means from said second abutment member.

4. A portable router for plywood patching operations or the like, said router comprising a supporting base adapted to rest stably on a generally horizontal plywood panel when positioned thereon for routing a defect area from the face ply of such panel by progressive movement thereover, a router head for carrying and driving a router tool, track means fixed on said base and extending in a line parallel to the plane of the plywood panel upon which the base is resting, router head carriage means slidable along said track means and carrying said router head pivotally in relation to said base to permit swinging of such router head to and from cutting engagement with the plywood panel about an axis substantially parallel to such panel, stop means comprising an elongated guide element fixed on said base and extending parallel to said track means, and traveling abutment means engageable with said guide element and interposed between such element and the router head to limit downward tilting of said router head relative to the panel positively in all positions of said router head along said track and thereby limit the depth of cut in the panel, and stop means limiting movement of said carriage in both directions along said track positively to fix the length of cut of the router, wherein the track means comprises a rod and the router head carriage means comprises a collar encircling said rod to slide lengthwise and rotatively thereon, the router head being fixedly connected to said collar, wherein the traveling abutment means comprises a first abutment member fixed to the router head for tilting therewith, and a second abutment member having an element slidable on the rod and another element continuously contacting the guide element, said second abutment member being engageable by said first abutment member to limit downward tilting of the router head in cutting position thereof and being coupled with the collar to slide conjointly therewith lengthwise of the rod but to permit tilting of said collar independently of such second abutment member.

5. A portable router for cutting cavities in panels, comprising a supporting base including a panel engaging means on one side thereof defining substantially a plane, track means supported by said base at the side thereof remote from said panel engaging means and substantially parallel to the plane of said panel engaging means, a router head, router head supporting means including a relatively pivoted carriage means and bracket means slidable along said track means and guiding said router head for pivotal movement relative to said base toward said panel engaging means and into cutting engagement with a panel engaged by said panel engaging means, and stop means carried by said bracket and engageable with said carriage means, thereby operable to limit such pivotal movement of said router head toward said panel engaging means for limiting the depth of cut in the panel effected by such head.

ROGER F. TURNBULL.

REFERENCES CITED

The following references are of record in the file of this patent:

UNITED STATES PATENTS

| Number | Name | Date |
| --- | --- | --- |
| 1,532,683 | Carter | Apr. 7, 1925 |
| 1,569,490 | Hiscock | Jan. 12, 1926 |
| 1,828,043 | Hedgpeth | Oct. 20, 1931 |
| 1,865,759 | Hughes | July 5, 1932 |
| 1,883,392 | Moll | Oct. 18, 1932 |
| 1,899,883 | Sacrey | Feb. 28, 1933 |
| 2,534,167 | Goff | Dec. 12, 1950 |